US008491377B2

(12) United States Patent
Smolucha

(10) Patent No.: US 8,491,377 B2
(45) Date of Patent: Jul. 23, 2013

(54) METHOD OF USING NON-MONETARY CHATTEL IN GAMING MACHINES

(75) Inventor: Walter E. Smolucha, Melrose Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 12/843,626

(22) Filed: Jul. 26, 2010

(65) Prior Publication Data

US 2011/0021264 A1 Jan. 27, 2011

Related U.S. Application Data

(63) Continuation of application No. 11/124,411, filed on May 6, 2005.

(60) Provisional application No. 60/569,384, filed on May 7, 2004.

(51) Int. Cl.
*A63F 13/00* (2006.01)

(52) U.S. Cl.
USPC .................................. 463/25; 463/16; 463/29

(58) Field of Classification Search
USPC ................................................ 463/16, 25, 29
See application file for complete search history.

(56) References Cited

U.S. PATENT DOCUMENTS 5,761,647 A * 6/1998 Boushy ........................ 705/7.29
5,811,772 A 9/1998 Lucero
5,813,912 A * 9/1998 Shultz ............................. 463/25
6,139,431 A * 10/2000 Walker et al. ................... 463/20
6,244,958 B1 6/2001 Acres
6,379,247 B1 4/2002 Walker et al.
6,431,983 B2 8/2002 Acres
6,629,591 B1 10/2003 Griswold et al.
7,200,571 B1 4/2007 Jenniges et al.
2002/0169660 A1 11/2002 Taylor et al.
2003/0032474 A1* 2/2003 Kaminkow ..................... 463/25
2003/0050111 A1 3/2003 Saffari
2003/0055780 A1 3/2003 Hansen et al.
2003/0083943 A1 5/2003 Adams et al.
2003/0104862 A1 6/2003 Acres
2003/0134674 A1* 7/2003 Raniere ........................... 463/25
2003/0148807 A1 8/2003 Acres
2004/0002369 A1 1/2004 Walker et al.
2004/0030654 A1* 2/2004 Walker et al. ................... 705/53
2004/0048658 A1 3/2004 Sanders
2004/0111366 A1 6/2004 Schneider
2004/0143494 A1 7/2004 Henderson et al.
2005/0003887 A1 1/2005 Seelig
2005/0261056 A1 11/2005 Smolucha
2006/0148559 A1* 7/2006 Jordan et al. .................... 463/29

OTHER PUBLICATIONS

"U.S. Appl. No. 11/124,411, Non-Final Office Action mailed Nov. 9, 2010", 17.
"U.S. Appl. No. 11/124,411, Appeal Brief", 26 pgs.

(Continued)

*Primary Examiner* — James S McClellan
(74) *Attorney, Agent, or Firm* — Schwegman Lundberg & Woesnner, P.A.

(57) ABSTRACT

The invention described herein includes a system for playing a game on a gaming machine using non-monetary chattel. The system includes a bank for storing, depositing, and withdrawing non-monetary chattel based upon play outcome on the gaming machine. The system also includes a mechanism for relaying data regarding the non-monetary chattel between the bank and the gaming machine; and redemption mechanism for converting the non-monetary chattel in the bank to an exchange medium.

20 Claims, 4 Drawing Sheets

OTHER PUBLICATIONS

"U.S. Appl. No. 11/124,411, Examiners Answers mailed Dec. 27, 2011", 19 pgs.

"U.S. Appl. No. 11/124,411, Final Office Action mailed Apr. 14, 2011", 19 pgs.

"U.S. Appl. No. 11/124,411, Non-Final Office Action mailed May 5, 2009", 14 pgs.

"U.S. Appl. No. 11/124,411, Response filed Mar. 9, 2011 to Non Final Office Action mailed Nov. 9, 2010", 14 pgs.

"U.S. Appl. No. 11/124,411, Response filed Oct. 5, 2009 to Non Final Office Action mailed May 5, 2009", 10 pgs.

"U.S. Appl. No. 11/124,411, Response filed Jun. 28, 2010 to Final Office Action mailed Jan. 26, 2010", 9 pgs.

"U.S. Appl. No. 11/124,411, Final Office Action mailed Jan. 26, 2010", 16 pgs.

* cited by examiner

724

| | 910 | 912 | 914 | 916 | 918 |
|---|---|---|---|---|---|
| | NAME | PLAYER ID NUMBER | TRACKING NUMBER | FREQUENT FLYER NUMBER | GAS CARD NUMBER |
| 920 | MARY DAY | 111111 | AA-111 | MH-202 | 014378 |

METHOD OF USING NON-MONETARY CHATTEL IN GAMING MACHINES

RELATED APPLICATIONS

This application is a continuation application of U.S. patent application Ser. No. 11/124,411, filed May 6, 2005, which claims the priority benefit of the filing date of U.S. Provisional Application Ser. No. 60/569,384, filed May 7, 2004, the contents of which are incorporated herein by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2004, WMS Gaming, Inc. All Rights Reserved.

BACKGROUND

The present invention relates to a system and to a method for playing a game on a gaming machine using non-monetary, incentive-based chattel, instead of coinage or other currency.

Gaming establishments have, in recent years, begun offering bonuses and complementary awards that include incentive-based rewards, such as frequent flyer miles. For instance, the Walker et al. U.S. Pat. No. 6,379,247, issuing Apr. 30, 2002, describes a method and system for rewarding frequent flyer miles to players playing live gaming establishment games. The U.S. Pat. No. 6,244,958, describes a system wherein a player wagers points.

DESCRIPTION

Figure 1:
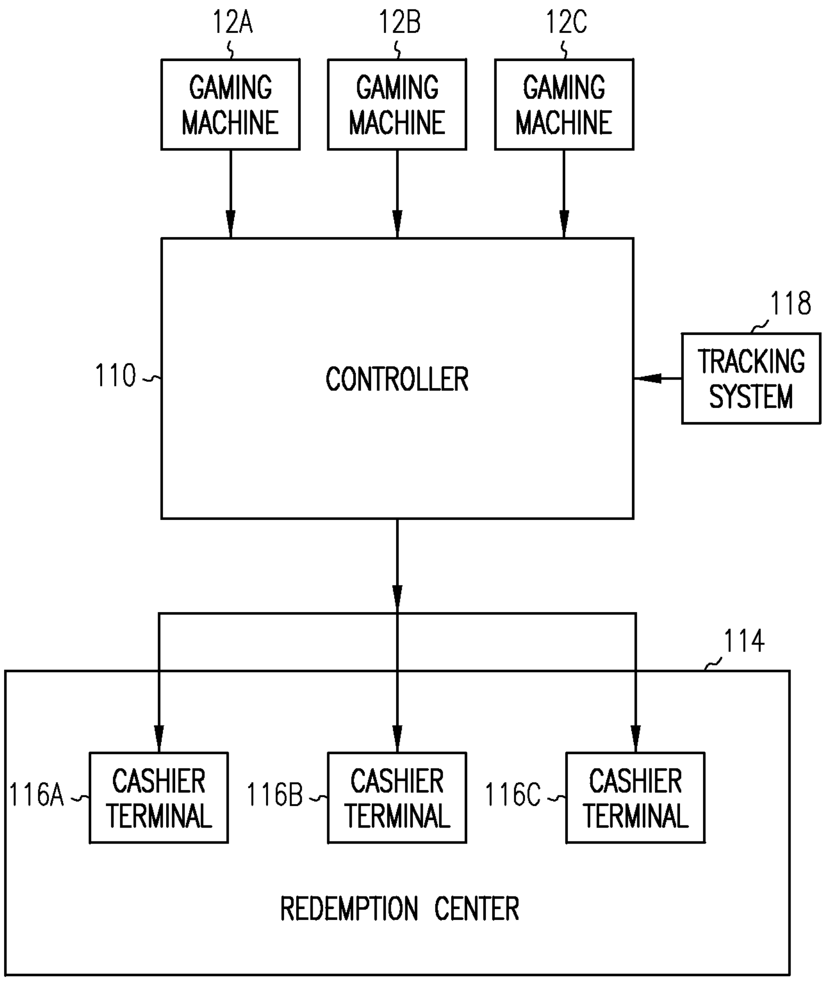
FIG. 1 illustrates a schematic view of an incentive tracking system embodiment employed for playing gaming establishment games, of the invention described herein.

One embodiment of the invention includes a system for playing a game on a gaming machine using non-monetary chattel. The system includes a computer readable storage medium for storing data regarding non-monetary chattel and, in one embodiment, a conversion mechanism for converting the non-monetary chattel to gaming establishment points and for converting gaming establishment points to non-monetary chattel. For gaming establishment points embodiments, the system includes a second computer readable storage medium for storing points. For other embodiments, the system's computer readable storage medium stores information concerning only predefined chattel having a defined value when redeemed, such as, for example, frequent flyer miles from pre-selected airlines and hotel days from pre-selected hotels. A defined number of frequent flyer miles from a pre-selected airline are redeemable for a specific type of round trip, for instance. The defined value of the non-monetary chattel is provided by the issuing party, such as an airline, for some embodiments and a clearing house trading many types of incentive based non-monetary chattel for other embodiments.

The system of the invention described herein additionally includes a gaming establishment bank for depositing and withdrawing and tracking non-monetary chattel from the first computer readable storage medium and for some embodiments, adding gaming establishment points and subtracting gaming establishment points from the second computer readable storage medium for storing point information. The gaming establishment points are added and subtracted based upon game outcome on one or more gaming machines. For embodiments employing points, deposits and withdrawals of non-monetary chattel are made based upon conversion of gaming establishment points to non-monetary chattel. For other embodiments, the non-monetary chattel increments are directly added and subtracted.

The system further includes a card, such as a credit card, token or other medium, for initializing a gaming machine to play using the non-monetary chattel. The system also includes a controller for coordinating play outcome with bank deposits and withdrawals and for communication with an entity providing the non-monetary chattel, such as an airline.

The system also includes a redemption center so that players can redeem their non-monetary incentive chattel when they have concluded play. The redemption center permits players to redeem the same type non-monetary chattel that the player used to initiate play. Some embodiments of the redemption center permit the player to redeem one form of non-monetary chattel for another form of non-monetary chattel or monetary chattel. For instance, the player is permitted to redeem incentive based non-monetary chattel for cash, or an airline ticket, or a gift certificate, to name only a few exemplary options that are not intended to limit the scope of the invention.

As used herein, the term "non-monetary chattel" refers to frequent flyer miles, points accrued for credit card usage, and other rewards or incentives for using the services of a particular company or purchasing goods from a company. In addition to frequent flyer miles, the non-monetary chattel includes points on a gasoline card, points or days accrued for staying at a particular hotel, points accrued for using a particular website, points or phone time accrued for using a particular phone service, or for buying merchandise at a particular store, or frequent shopper points. Non-monetary chattel is accruable chattel that is redeemable for goods or services when predefined thresholds are met. Non-monetary chattel as used herein refers to chattel paper or electronic chattel that is not legal tender. The term "monetary chattel" refers to chattel paper in a form of legal tender and coinage.

With the invention described herein, owners of the non-monetary chattel use the chattel to play one or, for some embodiments, more than one, wagerng. The threshold to play is for some embodiments, lower than the lowest redeemable quantity of non-monetary chattel. For other embodiments, the lowest level of non-monetary chattel that can be used for playing a wagering game is at or above the lowest redeemable level. As used herein, the term "bank" refers to a database for storing and updating data related to non-monetary chattel and for storing and updating data regarding players of one or more wagering games. For some embodiments, the bank also stores data concerning points that have a relationship with non-monetary chattel.

As used herein, the term "house" refers to a non-chattel account managed by a gaming establishment.

As used herein, the term "gaming machine" refers to a machine into which a coin or token is deposited, or which is activated by a card or token associated with data regarding non-monetary chattel, to play a game that uses a video display or an electromechanical device with a spinning reel. The gaming machines include slot machines and push button machines. The gaming machines include coin operated machines and machines having a serial interface. Gaming machines also include gaming tables capable of being initiated by a card or token.

As used herein, the term "gaming activity" refers to playing gaming machines, card games such as black jack, poker, baccarat, table games such as roulette, craps, keno and lotteries.

To use the system of the invention, a player has non-monetary chattel that he or she can wager. The player is not, for some embodiments, required to have non-monetary chattel at a threshold level redeemable for goods or services, however. In one embodiment, presented to exemplify the invention and not to limit the invention, the player has a frequent flyer card with a positive balance of frequent flyer miles prior to initiating play in a gaming establishment. In another embodiment, the player has two or more cards that each includes a positive quantity of frequent flyer miles from different airlines. While frequent flyer miles are discussed, it is understood that other types of non-monetary incentives or promotional chattel are usable in the system of the invention. For some embodiments, one or more of the player's cards that includes a record of frequent flyer miles is a credit card.

In one embodiment, a gaming establishment sets up an account for the player in a gaming establishment bank, which is a non-monetary chattel bank, managed by the gaming establishment. The initial balance in the bank for a player, includes a cumulative sum of the frequent flyer miles or other non-monetary chattel recorded on one or more cards owned by the player, that is transferred from the card or cards, to the bank. The frequent flyer miles or other non-monetary chattel transferred to the bank for each player are recorded and tracked in the non-monetary chattel bank. In return for depositing the non-monetary chattel in the bank, the player receives a card or token capable of activating play on gaming machines. In one embodiment, the player plays with his or her credit card or incentive card, such as a frequent flyer card.

In one embodiment, the bank deducts the frequent flyer miles on each card owned by the player and deposits the frequent flyer miles in the non-monetary chattel gaming establishment bank. The frequent flyer miles in the bank are increased or decreased based upon a game outcome when the player is playing on one or more gaming machines. The player controls the frequent flyer miles or other forms of non-monetary chattel that are deducted or added by betting frequent flyer miles or other non-monetary chattel within a limit selected by the player. The player is blocked, based upon the bank balance, from betting more frequent flyer miles or other forms of non-monetary chattel than he or she has to play.

At the conclusion of play, the player has an option to request that the frequent flyer miles or other forms of non-monetary chattel, are credited to more than one card containing promotional credits. In other embodiments, all of the player's non-monetary chattel bank account is converted back to the original non-monetary chattel form and are applied to a single card. For other embodiments, the player redeems the non-monetary chattel for cash. For other embodiments, the player redeems the non-monetary chattel for airline tickets or paid hotel rooms or other forms of non-monetary chattel. For some embodiments, the player is permitted to redeem the non-monetary chattel only at preselected businesses, such as specified travel agencies, hotels, and ticket sellers.

In one invention embodiment, the system includes a conversion mechanism for converting frequent flyer miles and other forms of non-monetary chattel into gaming establishment points. The conversion mechanism standardizes values of frequent flyer miles from multiple airlines, as well as other forms of non-monetary chattel, into a single point system. In one embodiment, the conversion device also standardizes value of other forms of non-monetary chattel into gaming establishment points having a single value. The conversion device receives conversion input from each vendor providing non-monetary chattel. The conversion device optionally receives conversion data from one or more clearing houses dealing in non-monetary chattel.

The player bets points for some embodiments and non-monetary chattel for other embodiments and a running total of the bet or bets is displayed on the gaming machine being played. As points or non-monetary chattel are accrued or lost based upon a player's game outcome, the conversion device allocates frequent flyer miles and other forms of non-monetary chattel to the player's account in the bank or transfers frequent flyer miles and other forms of non-monetary chattel from the player's account to the house.

In one embodiment, the standardized points are stored in the non-monetary chattel bank. The points are converted by the conversion device to frequent flyer miles or other types of non-monetary chattel when the player cashes out.

The non-monetary chattel gaming establishment bank resides on a file server that maintains and updates gaming establishment points and non-monetary chattel available to each player. In one embodiment, an account file for each player in the non-monetary chattel server bank includes the player's name, gaming establishment point number, frequent flyer number and conversion mechanism that also reside on the server. For instances where the player is converting other types of non-monetary chattel, an identifier of this non-monetary chattel is also stored in the player's account file.

The gaming establishment issues a card for some embodiments, to the player, which is readable by a card reader on a gaming machine. For other embodiments, the gaming establishment issues a token that the player uses to play one or more gaming machines. For other embodiments, the player uses a credit card and with a PIN number, converts non-monetary chattel such as miles for credits. With the card or token, the player plays by betting with non-monetary chattel and wins or loses the non-monetary chattel. For some embodiments, the gaming establishment issues to the player its own gaming establishment card for redeeming frequent flyer miles, phone time and other preselected forms of non-monetary chattel or cash. The gaming establishment marks the card with the gaming establishment's marks and indicia that includes instructions for use.

In one embodiment, the gaming establishment card is a smart card that stores a running total of points based upon gaming establishment points initially on the card and gaming establishment points added or subtracted as a result of a game outcome. In this embodiment, the gaming establishment card is insertable into a gaming machine and activates play for the player. Play is activated when data on the gaming establishment card is verified by the bank or other player identifier file. The data includes the player's identity and gaming establishment points remaining on the card. For other embodiments, the gaming establishment card stores a running total of the non-monetary chattel brought to the game by the player.

The player bets points or non-monetary chattel, based upon the points or non-monetary chattel remaining, shown on the display. In some embodiments, the player is locked out of play when the point total reaches a preselected minimum value. The player is permitted to use the gaming establishment card to play on multiple gaming machines, so long as the point or non-monetary chattel total is above the preselected minimum value. Each time the player selects a new machine to play, the player inserts the gaming establishment card. The gaming machine is activated when the gaming establishment card is inserted and data on the card is verified by the bank.

In one gaming establishment card embodiment, the gaming establishment card includes the conversion mechanism. In other embodiments, the conversion mechanism is a component of the gaming machine or is a component wherein output is received by the gaming establishment card or gaming machine or both. Thus, the player views a running total of frequent flyer miles or other form of non-monetary chattel or gaming establishment points during the course of play on the gaming machine. Gaming establishment cards that do not include the conversion device provide a running total of non-monetary chattel to the player. For both types of gaming establishment cards, the running total of gaming establishment points and, for some embodiments, non-monetary chattel, is displayed on the gaming machine that the player is playing.

The status of points or non-monetary chattel may be conveyed to the player by one or more of a sound emitted by a gaming machine or a light pattern denoting status that is displayed by the gaming machine.

In another embodiment, the player is given a token to activate a gaming machine. The token initializes the gaming machine and sets the gaming machine so that it tracks points that are convertible to non-monetary chattel. These gaming machine embodiments include tracking mechanisms that track changes in non-monetary chattel and, for some embodiments, changes in player data. The gaming machine displays points remaining for the player that are available for play. The gaming machine also communicates with the non chattel bank to initiate deposit or withdrawal of points from the player's account in the gaming establishment bank. Specifically, point or non-monetary chattel changes, additions for games wherein the player wins and subtractions where the player loses are communicated to the gaming establishment bank. In one embodiment, access to play is denied when the point balance reaches a preselected limit.

To apply credit from the player's account so that the player can play one of the gaming machines, the player inserts his or her gaming establishment card into one of the card readers associated with each gaming machine. The amount of credit balance remaining in the player's account appears on a display of the gaming machine wherein the card was inserted. In one other embodiment, the maximum number of points playable on the gaming machine is debited from the player's account and applied to a points meter on the machine. For some embodiments, the reels of the gaming machine spin automatically once the points appear on the credit meter or the player presses a button or pulls a handle to cause the reels to spin. If a combination appearing on the reels after coming to a halt is one for which a jackpot is paid to the player, the gaming machine pays the jackpot by applying the amount of jackpot credit to the player's account in the form of points or frequent flyer miles or other type of non-monetary chattel.

For some embodiments, the preselected limit of points or non-monetary chattel is determined by the gaming establishment. For other embodiments, the preselected limit is determined by the player, prior to beginning play.

At the end of play, the player "cashes" out and collects the total frequent flyer miles or other type of non-monetary chattel from the gaming establishment bank. For some embodiments, the gaming establishment bank credits the player with additional points won by the player and adds them to the frequent flyer card or gaming establishment card owned by the player. If the player loses all of the points or frequent flyer miles, or other types of non-monetary chattel, the balance in the player's bank account for the frequent flyer card or gaming establishment card or other type of non-monetary chattel is zero.

In another embodiment of the invention, frequent flyer miles or other forms of non-monetary chattel are all given the same value. This system does not include a mechanism for points accounting and does not include a conversion device. The frequent flyer mile or other non-monetary chattel total is transferred to the gaming establishment bank from the player's frequent flyer cards or other non-monetary chattel cards. The player's identity and frequent flyer card numbers and other non-monetary chattel card identification numbers are also transferred. The balance on the cards after the copying is unchanged.

For these embodiments, the player plays a gaming machine by using the frequent flyer card or credit card or other non-monetary chattel card itself to activate the gaming machine. The credit card or frequent flyer card or gas card or other non-monetary chattel card is inserted into the gaming machine and data on the card is transmitted to the gaming establishment bank and compared. If the data on the card matches data in the gaming establishment bank, the gaming machine is activated.

The player bets frequent flyer miles or other type of non-monetary chattel when playing the gaming machine. The frequent flyer miles or other form of non-monetary chattel are deducted from the player's card if the player loses the game. The frequent flyer miles or other form of non-monetary chattel are added to the player's card if the player wins the game. In particular, the gaming machine signals a wager quantity to the gaming establishment bank. The gaming machine also signals to the gaming establishment bank, whether the wager quantity was won or lost. If the wager was lost, frequent flyer miles or other form of non-monetary chattel are deducted from the player's card. If the wager was won, the bank credits frequent flyer miles to the player's card.

In another embodiment, the gaming establishment functions as a "clearing house." In this capacity, the gaming establishment clearing house converts incentive increments from different sources of non-monetary chattel to a single point system. The gaming establishment clearing house accepts non-monetary chattel on a basis of fair trade. In one embodiment, the fair trade occurs when non-monetary chattel having an equivalent point value is exchanged. With this embodiment, players have many options for redeeming non-monetary chattel, ranging from tickets to cash, to gift certificates, to paid hotel accommodations and so forth.

The card, obtained from the gaming establishment, is usable for insertion into a gaming machine to commence play. Points are added and deducted from the card in accordance with the wins and losses of the player. The points are redeemable in accordance with rules and facilities provided by the gaming establishment clearing house. The gaming establishment clearing house has, for some embodiments, redemption facilities outside of the gaming establishment. For some embodiments, redemptions facilities are located within a gaming establishment.

In one embodiment, the player tracking and accounting data extraction are performed on one gaming machine system. In another embodiment, the player tracking and accounting data extraction are performed on separate systems. Each gaming machine that permits play using points or frequent flyer miles or other types of non-monetary chattel includes a player tracking module that tracks the player playing the gaming machine. In one embodiment, the player tracking module includes a player tracking controller, a card reader, a display driver and a display. The gaming machine includes a point or a non-monetary chattel tracking module for tracking the points or non-monetary chattel bet, won or lost at the gaming machine. For some embodiments, the points or non-monetary chattel module is a component of the player tracking module. The gaming machine communicates with the gaming establishment bank through a communication node.

In another embodiment, illustrated at 10 in FIG. 1, gaming machines 12*a*, 12*b* and 12*c* are in communication with a central controller 110 via a hardwired or wireless communication network, such as a local area network, a wide area network or the Internet. Also in communication with the central controller 110 are one or more gaming establishment redemption centers 114. In one embodiment, the redemption center 114 is in a location within the gaming establishment wherein players redeem non-monetary chattel receipts. The redemption center 114 includes a plurality of cashier terminals 116*a*, 116*b*, and 116*c*. Each cashier terminal 116*a*, 116*b* and 116*c* is in communication with the central controller 110.

For some embodiments, the gaming establishment bank is a component of a central controller 110 that stores records of the non-monetary chattel or conversion points for a given player and assigned to the player's account. The central controller 110 is also in communication with at least one tracking system for the non-monetary chattel 118. For frequent flyer miles, for instance, the central controller 110 is in communication with at least one participating airline's mileage tracking system 118 so that this stored information is transferred to the appropriate airline.

The airline mileage tracking system 118 is a conventional system that is operated by a commercial airline to maintain frequent flyer records. While an airline mileage tracking system is described, it is understood that other reward tracking systems are included in the invention described herein. Such programs and systems are known to those of ordinary skill in the art of reward incentive tracking status. In another embodiment, the central controller 110 is in communication with a non-monetary chattel exchange wherein specific types of non-monetary chattel are traded.

Any of the controller 110, gaming machines 12*a*, 12*b* or 12*c*, gaming establishment redemption center 114 and incentive tracking system 118 are, for some embodiments, physically proximate to any other device for some embodiments. For other embodiments, these components are geographically remote from any device.

Figures 2, 3:
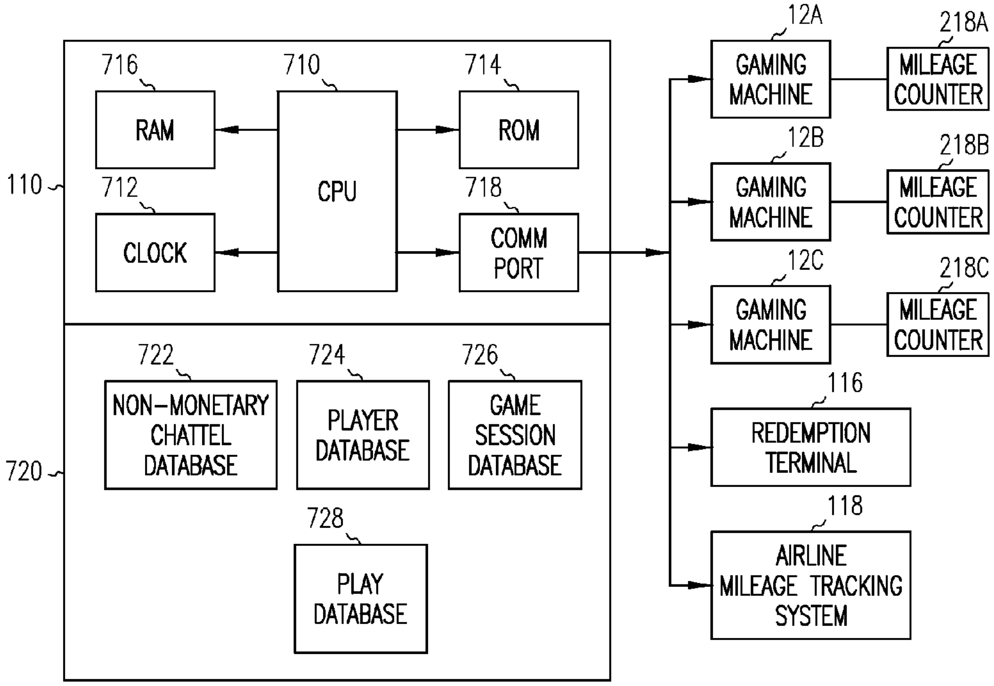
FIG. 2 illustrates a schematic view of a central controller of the invention described herein
FIG. 3 illustrates a schematic view of player data stored by the central controller illustrated in FIG. 2.

The central controller 110, illustrated generally in FIG. 2, includes a CPU 710 and clock system 712. The CPU 710 executes instructions according to a program stored in a ROM 714. During the execution of instructions, the CPU 710 stores data in and retrieves data from a RAM 716 coupled thereto. The central controller 110 also includes a communications port 718 coupled to the CPU 710. The communications port 718 allows the central controller 110, via its CPU 710 to communicate with other components of the system 100. Specifically, the communication port 718 is coupled to the gaming machines 12*a*, 12*b*, 12*c*, gaming establishment redemption terminals 116 and airline tracking system 118. While airline tracking system is described, it is understood that other tracking systems for other types of non-monetary chattel are usable in the system of the present invention.

The central controller 110 includes a data storage device 720, such as one or more magnetic, optical, or diskette drives. The data storage device 720 is operative to store non-monetary chattel databases, such as frequent flyer mile database 722, a player database 724, an optional session database 726, and a play database 728. The player database 724, illustrated in FIG. 3, includes records 920 that correlate player identifying information with a particular value of non-monetary chattel. The player identification information includes the player's name, stored in the name field 910, the player's identification number 912, and the player's non-monetary chattel accounts 914, 916, and 918. In one embodiment, the player's frequent flyer accounts are stored in the carrier frequent flyer account field 916 and another source of non-monetary chattel 918. The player database 724 also includes, in one embodiment, a tracking number field 914.

The tracking number field 914 allows information in the player database 724 to be correlated with information in the player's non-monetary chattel accounts. In one example, information in the player database 724, MARY DAY, had a winning having a first tracking number 914. Locating this tracking number in the non-monetary chattel database indicated that MARY DAY received 1000 miles. MARY DAY had an option to assign the non-monetary chattel to her frequent flyer account MH-202. MARY DAY won the non-monetary chattel at gaming machine which is for some embodiments, specified in the database 724. Arrangements of stored data presented herein are for exemplary purposes only. Other arrangements are within those having ordinary skill in the art.

Figure 4:
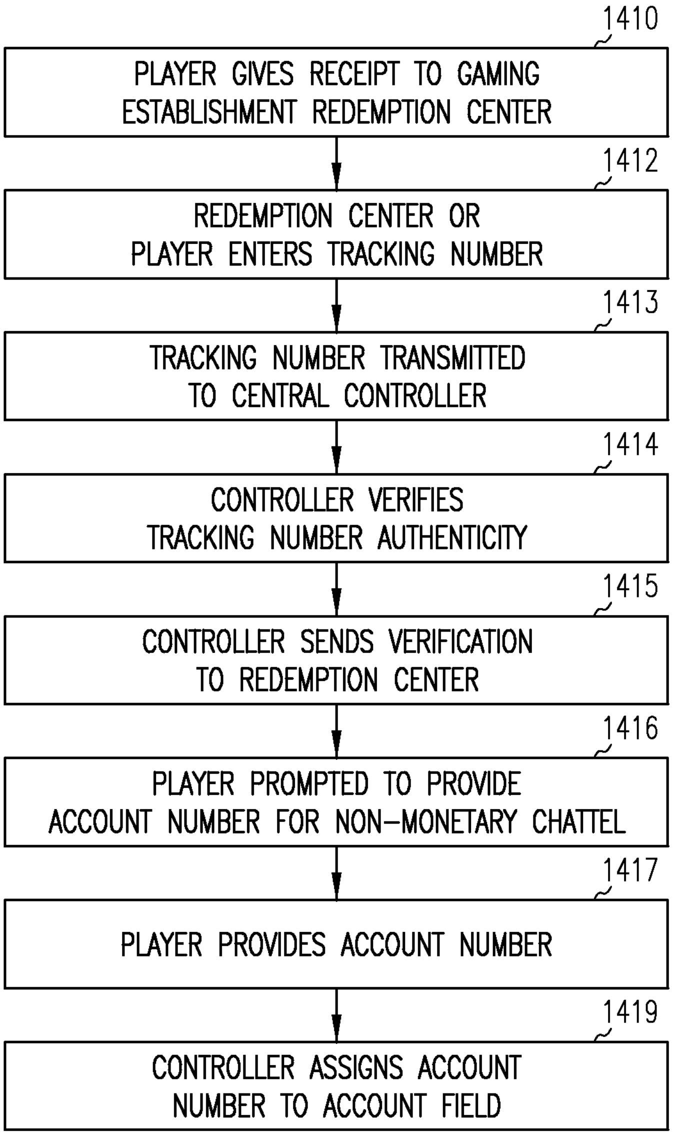
FIG. 4 is a flowchart illustrating one redemption embodiment for the incentive system of the invention described herein.

One embodiment for non-monetary chattel redemption is illustrated in FIG. 4. In step 1410, the player goes to the gaming establishment bank 114 and returns the card or token when the player has finished playing the gaming machines. The player receives from the gaming establishment bank, a non-monetary chattel receipt that the player passes on to the gaming establishment cashier. In step 1412, the cashier transfers the tracking number to the cashier terminal 116*a*, 116*b*, or 116*c*. The cashier terminal 116*a, b* or *c* transmits the tracking number to the gaming establishment central controller 110 in step 1413.

The gaming establishment central controller 110 accesses the non-monetary chattel database 722 and searches for the tracking number in step 1414. The searching allows the system 100 to verify the authenticity of the non-monetary chattel receipt in step 1415. If the tracking number is found in the non-monetary chattel database and has been assigned to an account number, such as a frequent flyer number, the receipt is deemed authentic. If the tracking number is not found or if the non-monetary chattel has not been assigned to an account, the receipt is deemed fraudulent. For situations not involving fraud, the central controller 110 sends a verification signal back to the cashier terminal 116*a* 116*b* or 116*c*.

Once the cashier terminal 116*a, b*, or *c* receives the verification, it prompts the cashier to ask the player to which account number the non-monetary chattel should be assigned, as shown in step 1416 The player gives the gaming establishment cashier the selected account number as shown in step 1417. The central controller 110 assigns the player's non-monetary chattel to the player in step 1419. Specifically, the central computer 110 accesses the rewarded mile database 722, locates the record having the received award tracking number, and enters the desired frequent flyer account number in the frequent flyer account number field. Thus, the player's awarded miles have been assigned to the specific flyer account.

Figure 5:
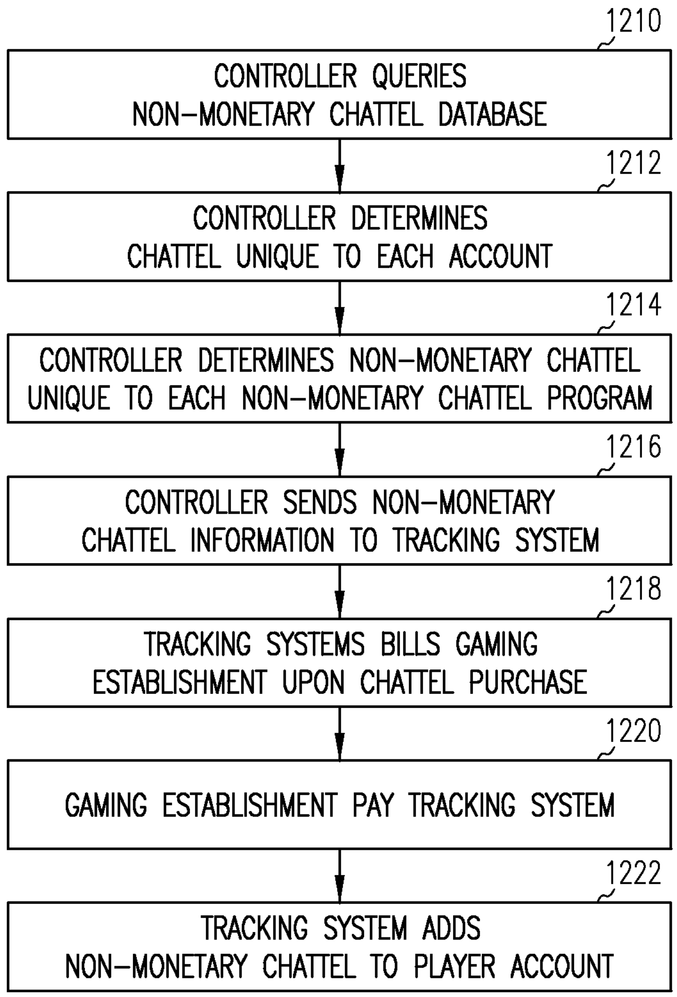
FIG. 5 is another flowchart illustrating another redemption embodiment for the incentive system of the invention described herein.

One process for transferring awarded miles to the assigned airline mileage tracking systems is illustrated in FIG. 5. This process takes place periodically and is initiated by gaming establishment personnel by selecting a program option at the cashier terminal 116*a*, 116*b*, or 116*c*.

An initial step in the transfer process includes the gaming establishment central controller 110 querying the rewarded miles database 722 in step 1210. Having queried the database 722, the central controller 110 determines the number of awarded miles assigned to each unique frequent flyer account number. In step 1212, the central controller queries the frequent flyer account number field in the rewarded miles database 722 and, for each unique account number, tabulates the total number of miles assigned. This information is stored in RAM 714 or data storage device 720. In step 1214, the central controller 110 determines the total number of awarded miles assigned to each frequent flyer program for each airline. Again, this is achieved by the central controller searching the frequent flyer account number field and tabulating in memory the total number of awarded miles for each such program.

Having determined the total number of awarded miles assigned to each frequent flyer account number, as well as the total number of awarded miles assigned to each airline frequent flyer program, the central controller 110 sends this mileage information to the appropriate airline mileage tracking system 118 as shown in step 1216. The communication between central controller 110 and airline tracking system 118 may be hard wired or wireless. In another alternative embodiment, communication of the mileage information includes simply generating a written report containing the mileage information and sending it to the airline.

Once the airline receives the mileage information from the central controller 110 or gaming establishment, the airline mileage tracking system 118 bills the gaming establishment based on the miles purchased in step 1218. In step 1220, the gaming establishment pays the airline mileage tracking system 118 for the miles purchased. Upon receiving payment, the airline mileage tracking system 118 adds the rewarded miles to each player's account in step 1222. The gaming establishment also has an ability to request transfer of frequent flyer miles and other non-monetary chattel from the player to the gaming establishment in instances where the player has lost the non-monetary chattel. The gaming establishment is then permitted to purchase airline tickets for players. For other types of non-monetary chattel, the gaming establishment is permitted to purchase increments of that too, such as hotel accommodations, gift certificates, gasoline and so forth. For some embodiments, the player is permitted to redeem one type of non-monetary chattel, such as airline miles, for another type of non-monetary chattel, such as a gift certificate.

For some embodiments, the player assigns miles awarded to a particular frequent flyer account. The player approaches the gaming establishment cage 116 and presents the player tracking card to the gaming establishment cashier. The gaming establishment cashier swipes the card through a card reader which transmits the player identification number stored on the card to the central controller 110. The central controller 110 accesses the player database 724 and locates the record containing the received player identification number in field 912. The central controller 110 reads the award tracking number from field 914 of that same record, and then locates the record in the rewarded miles database 722 having that same award tracking number in field. The miles have thus been located and are assigned as described above with reference to steps 1120-1126 of FIG. 4 or 5.

The gaming establishment card has a unique identification number stored thereon. When the player is issued the gaming establishment card, the player provides a frequent flyer account number, which is stored in the central controller 110. The frequent flyer account number is stored with the associated player's identification number. In operation, the player initiates play on a gaming machine 12*a*, 12*b*, or 12*c* by swiping the player tracking card through a card reader coupled to the mileage counter 218*a*, 218*b* or 218*c*, illustrated schematically in FIG. 2, or other non-monetary chattel increment counter. When the player decides to stop playing, the accumulated miles awarded and the player identification number are communicated to the central controller 110. The central controller 110, in turn, automatically assigns the awarded miles to the frequent flyer account previously provided. This embodiment allows the player to remain on the gaming establishment floor and to continue playing, rather than walking to the gaming establishment cage 116*a*, 116*b* or 116*c*, to assign the miles awarded.

For embodiments wherein other reward points are played, counters located on the gaming machines convert the reward points to another point-based system. The central controller 110 stores the reward points as it does frequent flyer miles in other embodiments. The reward points, rather than being transferred to an airline, are accumulated by the central controller 110. The gaming establishment, via the central controller 110, monitors each player's reward point total. In one embodiment, the gaming establishment permits the player to redeem non-monetary chattel for cash, tickets, and other benefits having a value commensurate with the value of the non-monetary chattel possessed by the player at the end of play.

Some embodiments include a session database used to track gaming machine session information such as a session identifier, player identifier, non-monetary chattel tracking number, gaming machine identifier, starting balance, current balance, total amount wagered, total amount won and lost. Additional records may also be included.

Having described and illustrated the principles of the invention in particular embodiments thereof, it should be apparent that the invention can be modified in arrangement and detail without departing from such principles. The scope of the invention is intended to be limited only by the claims appended hereto.

What is claimed is:

1. A system for playing a game on a gaming machine, comprising:

a clearing house for exchanging multiple types of non-monetary chattel and gaming establishment points according to rules of the clearing house, the gaming establishment points establishing a standardized single point system for use as bets on the gaming machine based on conversion rates between the non-monetary chattel and gaming establishment points;

a player account stored in a database and including gaming establishment points available to a player for betting, the available points based in part upon play outcome on the gaming machine using at least a portion of the gaming establishment points as a bet and exchanges using the clearing house;

a mechanism for relaying data regarding the balance of gaming establishment points between the player account and the gaming machine for use in the gaming machine by the player; and a converter configured to convert gaming establishment points won on the gaming machine by the player into a first type of non-monetary chattel.

2. The system of claim 1, wherein the player account includes an account identification associated with the first type of non-monetary chattel.

3. The system of claim 1, further comprising storing an award tracking number associated with the gaming establishment points won on the gaming machine.

4. The system of claim 3, further comprising a redemption terminal configured to:

receive the award tracking number; and verify the authenticity of the award tracking number before converting the gaming establishment points won on the gaming machine into the first type of non-monetary chattel.

5. The system of claim 1, further comprising a central controller configured to transmit information associated with the conversion of the gaming establishment points won into the first type of non-monetary chattel to a non-monetary chattel tracking system associated with the first type.

6. The system of claim 1, wherein the conversion rates are based on a vendor of non-monetary chattel.

7. The system of claim 1, wherein the conversion rates are based on clearing houses dealing in non-monetary chattel.

8. A method for playing a game on a gaming machine, comprising:

exchanging multiple types of non-monetary chattel and gaming establishment points according to rules of a clearing house, the gaming establishment points establishing a standardized single point system for use as bets on the gaming machine based on conversion rates;

storing a player account in a database, the player account including gaming establishment points and non-monetary chattel available to a player for betting, the available points based in part upon play outcome on the gaming machine using at least a portion of the gaming establishment points as a bet and exchanges of the clearing house; and converter configured to convert gaming establishment points won on the gaming machine by the player into a first type of non-monetary chattel.

9. The method of claim 8, wherein the player account includes an account identification associated with the first type of non-monetary chattel.

10. The method of claim 8, further comprising storing an award tracking number associated with the gaming establishment points won on the gaming machine.

11. The method of claim 10, further comprising:

receiving the award tracking number; and verifying the authenticity of the award tracking number before converting the gaming establishment points won on the gaming machine into the first type of non-monetary chattel.

12. The method of claim 8, further comprising transmitting information associated with the conversion of the gaming establishment points won into the first type of non-monetary chattel to a non-monetary chattel tracking system associated with the first type.

13. The method of claim 8, wherein the conversion rates are based on a vendor of non-monetary chattel.

14. The method of claim 8, wherein the conversion rates are based on clearing houses dealing in non-monetary chattel.

15. A non-transitory computer-readable storage medium comprising instructions, which when executed by at least one processors, cause the least one processor to perform operations comprising:

exchanging multiple types of non-monetary chattel and gaming establishment points according to rules of a clearing house, the gaming establishment points establishing a standardized single point system for use as bets on a gaming machine based on conversion rates;

storing a player account in a database, the player account including gaming establishment points available to a player for betting, the available points based in part upon play outcome on the gaming machine using at least a portion of the gaming establishment points as a bet and exchanges of the clearing house; and converter configured to convert gaming establishment points won on the gaming machine by the player into a first type of non-monetary chattel.

16. The non-transitory computer-readable storage medium of claim 15, wherein the player account includes an account identification associated with the first type of non-monetary chattel.

17. The non-transitory computer-readable storage medium of claim 15, the operations further comprising storing an award tracking number associated with the gaming establishment points won on the gaming machine.

18. The non-transitory computer-readable storage medium of claim 17, the operations further comprising:

receiving the award tracking number; and verifying the authenticity of the award tracking number before converting the gaming establishment points won on the gaming machine into the first type of non-monetary chattel.

19. The non-transitory computer-readable storage medium of claim 15, the operations further comprising transmitting information associated with the conversion of the gaming establishment points won into the first type of non-monetary chattel to a non-monetary chattel tracking system associated with the first type.

20. The non-transitory computer-readable storage medium of claim 15, wherein the conversion rates are based on a vendor of non-monetary chattel.

* * * * *